(12) United States Patent
Hericourt (10) Patent No.: US 6,823,393 B1
(45) Date of Patent: Nov. 23, 2004

(54) METHOD AND APPARATUS FOR SETTING THE VALUE OF A TYPE OF SERVICE FIELD IN THE HEADER OF THE IP DATAGRAM HAVING SOCKS DATA BY RETRIEVING A SOURCE ADDRESS AND APPLICATION ADDRESS WITHIN THE IP HEADER OF THE IP DATAGRAM

(75) Inventor: Olivier Hericourt, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 09/672,376

(22) Filed: Sep. 29, 2000

(30) Foreign Application Priority Data

Oct. 21, 1999 (EP) ............................................. 99480107

(51) Int. Cl.[7] .............................................. G06F 15/16
(52) U.S. Cl. ........................ 709/230; 709/203; 709/229; 370/475
(58) Field of Search ................................. 709/203, 227, 709/229, 230; 713/201; 370/401, 465, 475

(56) References Cited

U.S. PATENT DOCUMENTS

| | | | | |
|---|---|---|---|---|
| 6,104,716 A | * | 8/2000 | Crichton et al. ............ 370/401 |
| 6,195,366 B1 | * | 2/2001 | Kayashima et al. ........ 370/475 |
| 6,397,253 B1 | * | 5/2002 | Quinlan et al. ............. 709/227 |
| 6,452,915 B1 | * | 9/2002 | Jorgensen ................... 370/338 |
| 6,470,027 B1 | * | 10/2002 | Birrell, Jr. .................. 370/465 |
| 6,477,577 B1 | * | 11/2002 | Asano ......................... 709/227 |
| 6,490,626 B1 | * | 12/2002 | Edwards et al. ............ 709/229 |
| 6,529,937 B1 | * | 3/2003 | Murphy et al. ............. 709/203 |
| 6,636,509 B1 | * | 10/2003 | Hughes ....................... 370/389 |
| 2002/0169980 A1 | * | 11/2002 | Brownell .................... 713/201 |

* cited by examiner

*Primary Examiner*—Patrice Winder
*Assistant Examiner*—Oanh Duong
(74) *Attorney, Agent, or Firm*—Daniel E. McConnell; John R. Pivnichny; Dillon & Yudell LLP

(57) ABSTRACT

A method and system for setting the value of a type of service field in an Internet Protocol (IP) datagram in accordance with an application level protocol. The IP datagram is transmitted within a socks connection from a source application on a source device. The IP datagram includes a source IP address field in an IP header and a source port field in a Transmission Control Protocol (TCP) header. In accordance with the method of the present invention a source address of the source device is retrieved from the source IP address field of an incoming IP datagram. An application address of the source application is retrieved from the source port field of the incoming IP datagram. A type of service value has been associated with the retrieved source address and the retrieved application address. The type of service value is then determined and written to a type of service field within the IP datagram.

21 Claims, 9 Drawing Sheets

Logical View of an End User Accessing the World-Wide-Web (Prior Art)

FIG. 1

General Physical View of an End User Accessing the World-Wide-Web (Prior Art)

Socks Client and Socks Servers (Prior Art)

FIG. 9

METHOD AND APPARATUS FOR SETTING THE VALUE OF A TYPE OF SERVICE FIELD IN THE HEADER OF THE IP DATAGRAM HAVING SOCKS DATA BY RETRIEVING A SOURCE ADDRESS AND APPLICATION ADDRESS WITHIN THE IP HEADER OF THE IP DATAGRAM

CROSS REFERENCE TO RELATED APPLICATIONS

The present application is related to co-pending U.S. patent application Ser. No. 09/665,019, filed on Sep. 19, 2000.

BACKGROUND OF THE INVENTION

1. Technical Field

The present invention relates to computer networks, and more particularly to a method and system for setting the value of the Type of Service (TOS) field of an IP datagram according to the Application Level protocol used by Socks data in an end user workstation attached to an Internet Protocol (IP) network.

2. Description of the Related Art

Internet

The Internet is a global network of computers and computers networks (the "Net"). The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet:

(1) transmitting and receiving electronic mail, (2) logging into remote computers (the "Telnet"), and (3) transferring files and programs from one computer to another ("FTP" or "File Transfer Protocol").

TCP/IP

The Transmission Control Protocol/Internet Protocol (TCP/IP) protocol suite is used to establish an interconnection of networks that provide universal communication services: an internetwork, or internet. Each physical network has its own technology dependent communication interface (in the form of a programming interface) that provides basic communication functions between the physical network and the user applications. The architecture of the physical networks is hidden from the user. TCP/IP also provides interconnection between different physical networks to form what appears to the user to be one large network.

TCP is a transport layer protocol providing end-to-end data transfer and is responsible for providing a reliable exchange of information between networked computer systems. Multiple applications can be supported simultaneously over one TCP connection between two computer systems.

IP is an internetwork layer protocol hiding the physical network architecture bellow it. Part of the communicating messages between computers is a routing function that ensures that messages will be correctly directed within the network to be delivered to their destination. IP provides this routing function. An IP message is called an IP datagram.

Application Level protocols are utilized in addition to TCP/IP to transfer user and application data from a computer system to a destination computer system. Examples of such Application Level protocols include File Transfer Protocol (FTP), Telnet, Gopher, Hyper Text Transfer Protocol (HTTP).

IP Router

A "router" is a computer that interconnects two networks and forwards messages from one network to the other. Routers select the best transmission path between networks utilizing the IP layer of the TCP/IP protocol stack, such that any host (or computer) or workstation running TCP/IP over more than one interface could, in-theory, forward messages between networks. Because IP implements basic routing functions, the term "IP router" is often used. However, dedicated network hardware routers can provide more sophisticated routing functions than the minimum functions implemented in IP.

World Wide Web

With the increasing size and complexity of the Internet, tools that are often called navigators or navigation systems have been developed to help find information on the network. Navigation systems include standards such as Archie, Gopher and, most well-known, the World Wide Web ("WWW" or "the Web"). In addition to serving as an Internet-based navigation system, the Web is also an information distribution and management system for the Internet. The Web provides an end user with a seamlessly integrated format of information, including still images, text, audio and video. A user on the Web using a graphical user interface may transparently communicate with different host computers on the system, different system applications, and different information formats for files and documents including text, sound, and graphics.

Hypermedia

The Web uses hypertext and hypermedia. Hypertext is a subset of hypermedia and refers to computer-based "documents" in which readers move from one place to another in a document, or to another document, in a non-linear manner. To accomplish this, the Web uses a client-server architecture. Web servers enable a user to access hypertext and hypermedia information through the Web and the user's computer. (The user's computer is referred to as a client computer of the Web server computers.) Clients send requests to Web servers, which react, search, and respond. The Web allows client application software to request and receive hypermedia documents (including formatted text, audio, video and graphics) with hypertext link capabilities to other hypermedia documents, from a Web file server. The Web, thus, can be viewed as a collection of document files residing on Web host computers that are interconnected by hyperlinks using networking protocols, forming a virtual "web" that spans the Internet.

Uniform Resource Locations

A resource of the Internet is unambiguously identified by a Uniform Resource Locator (URL), which is a pointer to a particular resource at a particular location. A URL specifies the protocol used to access a server (e.g. HTTP, FTP, . . . ), the name of the server, and the location of a file on that server.

Hyper Text Transfer Protocol

Each Web page that appears on client monitors of the Web may appear as a complex document that integrates, for example, text, images, sounds and animation. Each such page may also contain hyperlinks to other Web documents so that a user at a client computer using a mouse may click on icons and may activate hyperlink jumps to a new page (which is a graphical representation of another document file) on the same or a different Web server.

A Web server is a software program on a Web host computer that answers requests from Web clients, typically over the Internet. All Web servers use a Hyper Text Transfer Protocol (HTTP) to communicate with Web clients. All types of data can be exchanged among Web servers and clients using HTTP, including Hyper Text Markup Language (HTML), graphics, sound and video. HTML describes the layout, contents and hyperlinks of the documents and pages. When browsing, a Web client converts user specified commands into HTTP GET requests, connects to the appropriate Web server to retrieve information, and waits for a response. The response from the server can be the requested document or an error message.

Browser

A Web client is also referred to as a Web browser, since it in fact browses documents retrieved from the Web server. After receiving data from a server, a Web client formats and presents the data or activates an ancillary application such a sound player to present the data. To do this, the server or the client identifies the various types of data received.

Intranet

Some companies use a mechanism similar to the Web to communicate inside their own corporation. Such a mechanism is called an "Intranet". These companies use the same networking/transport protocols and locally based Web servers to provide access to vast amount of corporate information in a cohesive fashion. As this data may be private to the corporation, and because the members of the company still require access to public Web information, they protect the access to their network by using a special protective system called a "firewall".

Firewall

A Firewall protects one or more intranet computers having Internet connections from access by external computers connected to the Internet. A firewall is a network configuration, usually created by hardware and software, that forms a boundary between networked computers within the firewall from those outside the firewall. The computers within a firewall form a secure sub-network with internal access capabilities and shared resources not available to outside computers.

Access to both internal and external computers is often controlled by a single machine comprising the firewall. Since this firewall computer directly interacts with the Internet, strict security measures against unwanted access from external computers are required.

Firewalls are commonly used to protect information such as electronic mail and data files within a physical building or an organization site. A firewall reduces the risk of intrusion by unauthorized people from the Internet by utilizing "proxies" or "socks" to control the access to information from each side of the firewall.

Proxy Server

An HTTP proxy is a special server that typically runs in conjunction with firewall software and allows an access to the Internet from within a firewall. Access by a proxy server is performed as follows. First the proxy server waits for a request (a HTTP request for example) from inside the firewall and forwards the request to the remote server outside the firewall. The proxy server then reads a response and sends the response back to the client.

A single computer can run multiple servers, each server connection identified by a port number. A proxy server, like an HTTP server or a FTP server, occupies a port. Typically, a connection uses standardized port numbers for each protocol (for example, HTTP=80 and FTP=21). For this reason, an end user must select a specific port number for each defined proxy server. Web browsers usually allow an end user to set the host name and port number of the proxy servers in a customization panel. Protocols such as HTTP, FTP, Gopher, WAIS, and Security usually have designated proxies.

Socks and Socks Server

Socks is a protocol which encapsulates Application Level protocols (for instance FTP, Telnet, Gopher, HTTP). Using Socks, the Application Level traffic between a system running a socks client software and a system running a socks server software is encapsulated in a virtual socks tunnel between both systems. Socks is primarily used by systems within an Intranet in order to gain a secure access to systems located outside the Intranet.

A Socks server acts as a relay between the systems within the Intranet and the systems outside the Intranet, thus hiding the internal systems from the external Internet and is thus one possible form of firewall. A socks server (also called a socks gateway) is a software entity that allows computers inside a firewall to gain access to the Internet. A socks server is usually installed on a server positioned either inside or on the firewall. To reach the Internet, computers within a firewall access the socks server as socks clients. Web browsers usually permit an end user to set the host name and port number of the socks servers in a customizable panel. In some operating systems, the socks server is specified in a separate file (e.g. socks.conf file). Socks servers act as a protocol layer underneath the standard TCP/IP protocols (HTTP, FTP, . . . ), and therefore cannot decode these protocol layers to determine what kind of data is being transferred.

Dispatcher System

When multiple Firewalls are used to gain access to systems outside the Intranet, a dedicated device called "Dispatcher System" is often used within the Intranet for dispatching the traffic to these multiple Firewalls. The main goal of the dispatcher system is to balance the load across the multiple Firewalls. For instance when a very powerful Firewall and a smaller Firewall are available, more traffic should be dispatched on the very powerful Firewall than on the smaller one. Such dispatcher systems are either dedicated hardware devices, or software components installed on existing network device (such as an IP Router).

More detailed explanations regarding the technical field as presented in the above sections can be found in the following publications incorporated herewith by reference:

"TCP/IP Tutorial and Technical Overview" by Martin W. Murhammer, Orcun Atakan, Stefan Bretz, Larry R. Pugh, Kazunari Suzuki, David H. Wood, International Technical Support Organization, October 1998, GG24-3376-05.

"Java Network Programming" by Elliotte Rusty Harold, published by O'Reilly, February 1997.

"Internet in a nutshell" by Valerie Quercia, published by O'Reilly, October 1997.

"Building Internet Firewalls" by Brent Chapman and Elizabeth Zwichky, published by O'Reilly, September 1995.

A problem arises in differentiating IP datagrams transporting Socks data in accordance with the Application Level protocol utilized to transport Socks data. The Socks protocol is a form of encapsulation of Application Level traffic such as HTTP, FTP, Telnet. When Socks servers are used within an Intranet to provide secure access to systems located outside the Intranet, IP routers and network devices within this Intranet only see and handle Socks traffic. As a consequence, all Application Level protocols such as HTTP, FTP, and telnet encapsulated by Socks are treated alike within the TCP/IP network.

When multiple Socks servers are used within the Intranet to access systems outside the Intranet, a dedicated device called a "dispatcher system" is often used for dispatching the traffic on these multiple Socks servers. The purpose of the dispatcher system is mainly to balance the load across the multiple Socks servers. For instance, when a larger Socks server and a smaller Socks server are both available, more traffic can be dispatched on the larger Socks server than on the smaller one.

In a Socks environment, the dispatcher system usually only sees and processes Socks traffic and is unable to distinguish the Application Level protocol which is encapsulated by Socks. As a consequence, all Application Level protocols such as HTTP, FTP, Telnet, are then treated alike by the dispatcher system. To solve this problem, the dispatcher system and any other IP network devices, such as IP routers, can use a TOS field in the header of IP datagrams comprising Socks data. For example, based on the TOS field, interactive Telnet traffic can be processed by a dispatcher system with a higher priority than batch FTP traffic. This Telnet traffic can be dispatched on a high capacity Socks server while the FTP traffic is dispatched on a lower capacity Socks server.

It would therefore be useful to set the value of the TOS field in IP datagrams comprising Socks data, according to the Application Level protocol used in the IP datagrams. Current solutions to address this problem include the following.

The TOS field can be set by a network device according to the protocol of the TCP data transported in the IP datagrams. That protocol is identified by the destination port field of the TCP header within the IP datagram. The major drawback of this approach is that in a Socks environment, the protocol of the TCP data transported in IP datagrams is always the Socks protocol. As a consequence, the TOS field always has the same value which corresponds to the Socks protocol. The TOS field is therefore not representative of the Application Level protocol of Socks data. For example, IP datagrams transporting HTTP, FTP, or Telnet data over Socks all have the same TOS value. The TOS field cannot be used to differentiate the IP datagrams according to the Application Level protocol of Socks data since this field always has the same unique value.

Alternatively, the TOS field can be set by the end user originating the Socks connection. Since the end user workstation originates the Socks connection, it knows which Application Level protocol is used by Socks data, and can therefore set the TOS field accordingly. The main drawback is that the end user workstation requires a specific software to set the TOS field according to the Application Level protocol. This specific software needs to be installed on all end user workstations originating Socks data. For large populations of end users, this means that a large number of end user workstations must be updated with this specific software. This is a time consuming and costly operation.

Furthermore, the association between TOS field values and Application Level-protocols is performed at the end user level. This may result in inconsistencies when, for example, policies are utilized within the same network. One end user workstation may set a TOS value of 7 for a Telnet protocol while another end user workstation may set a TOS value of 5 for the same Telnet protocol. As a consequence, the same Application Level protocol may be handled differently within the network depending on the end user workstation originating the Socks data.

SUMMARY OF THE INVENTION

A method and system for setting the value of a type of service field in an Internet Protocol (IP) datagram in accordance with an application level protocol are disclosed herein. The IP datagram is transmitted within a socks connection from a source application on a source device. The IP datagram includes a source. IP address field in an IP header and a source port field in a Transmission Control Protocol (TCP) header. In accordance with the method of the present invention a source address of the source device is retrieved from the source IP address field of an incoming IP datagram. An application address of the source application is retrieved from the source port field of the incoming IP datagram. A type of service value has been associated with the retrieved source address and the retrieved application address. The type of service value is then determined and written to a type of service field within the IP datagram.

All objects, features, and advantages of the present invention will become apparent in the following detailed written description.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE PREFERRED EMBODIMENT

Figure 1:
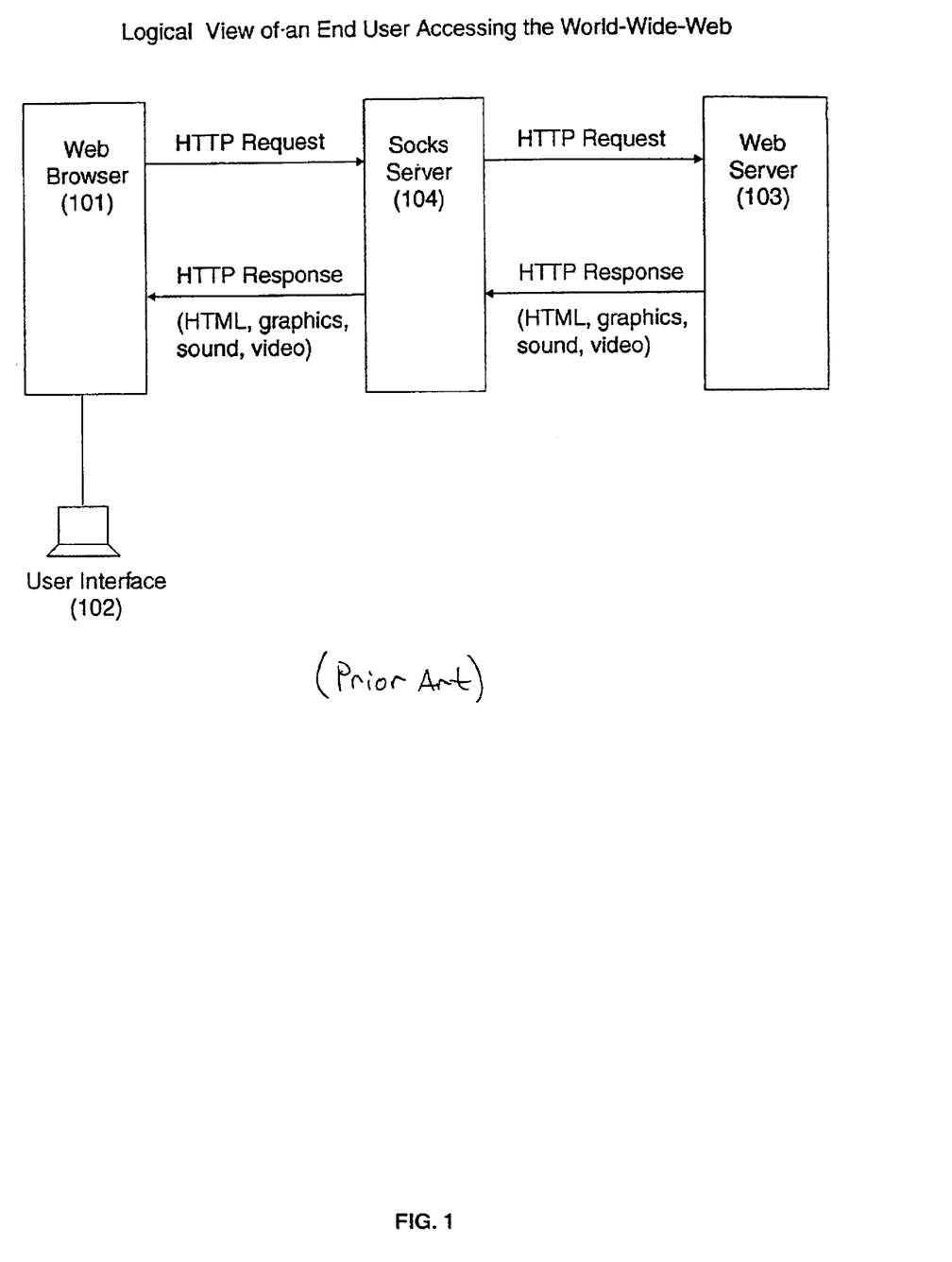
FIG. 1 is a logical view of an end user system accessing the World Wide Web, according to prior art.

FIG. 1 shows a user system with a user interface 102 comprising a Web browser 101 for accessing the World-Wide-Web (WWW). Data is transferred in the WWW using the HTTP protocol. HTTP requests and responses are exchanged between Web browser program 101 and a destination Web server 103 containing the WWW information the user wants to access. A Socks server 104, between Web browser 101 and Web server 103, acts as an intermediary HTTP Relay forwarding the HTTP requests and responses to their destination. Web browser program 101 makes an HTTP request to Socks server 104 which forwards the request to destination Web server 103. The flow in the reverse direction (HTTP response) again goes via Socks server 104 to Web browser 101. In this way, Socks server 104 can limit the traffic to authorized transactions according to its configuration possibly based on a defined security and access control policy. Socks server 104 thus protects the network where Web browser 101 is located.

Physical View

Figure 2:
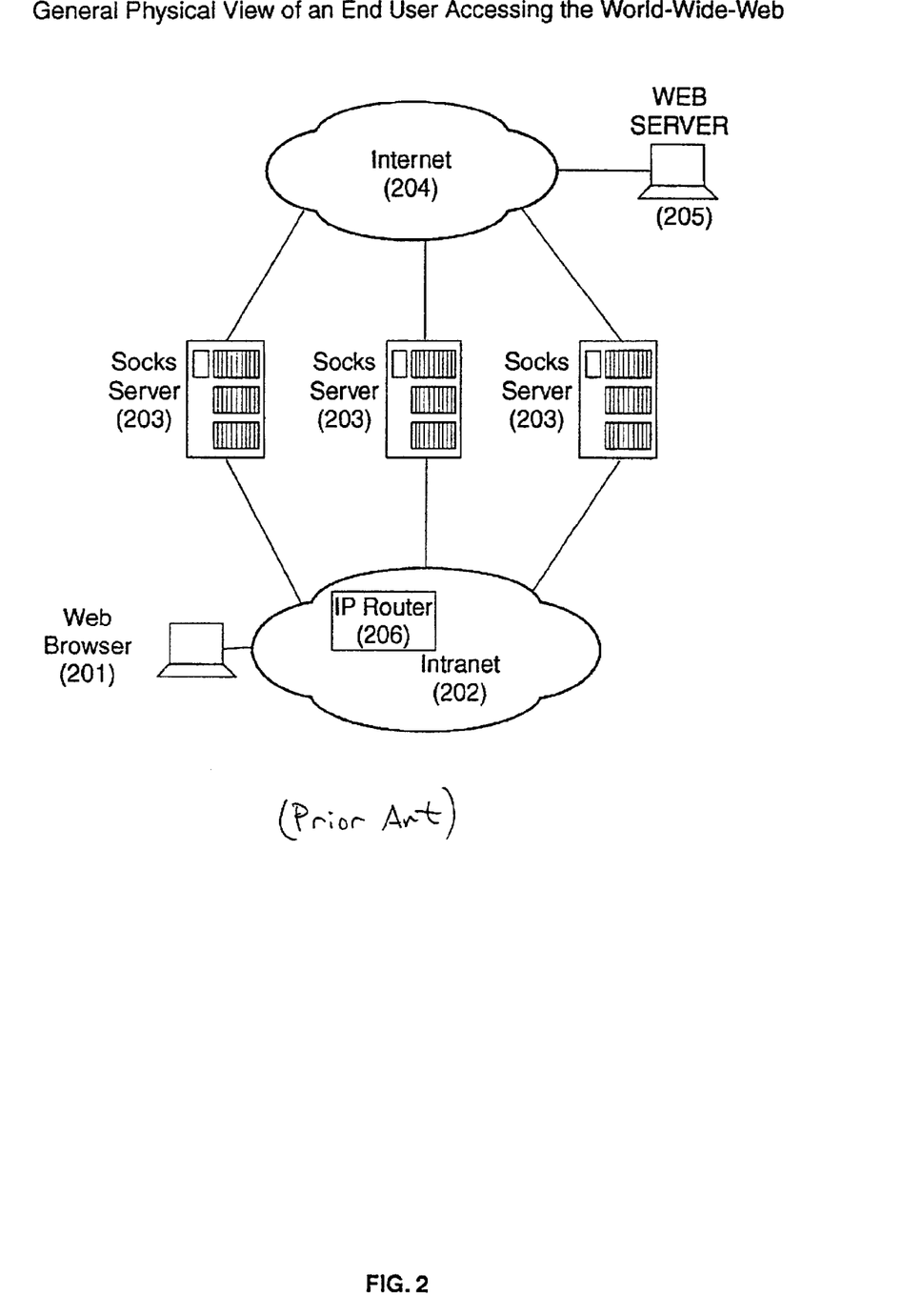
FIG. 2 is a general view of an end user system accessing the World Wide Web according to prior art.

FIG. 2 is a physical view of the logical system arrangement depicted in FIG. 1. In this particular example, a Web browser 201 runs on a system (workstation) connected to an Intranet 202 network. Intranet network 202 comprises network devices such as IP routers 206. Socks servers 203 protect both (private) Intranet 202 and Internet 204 which is public. A Web server 205 is also connected to the Internet 204. It is important to note that Socks servers 203 connect two networks and hence act as intermediaries for communications between the two networks. Multiple Socks servers are often used in order to provide access robustness and load sharing.

IP Datagram

Figure 3:
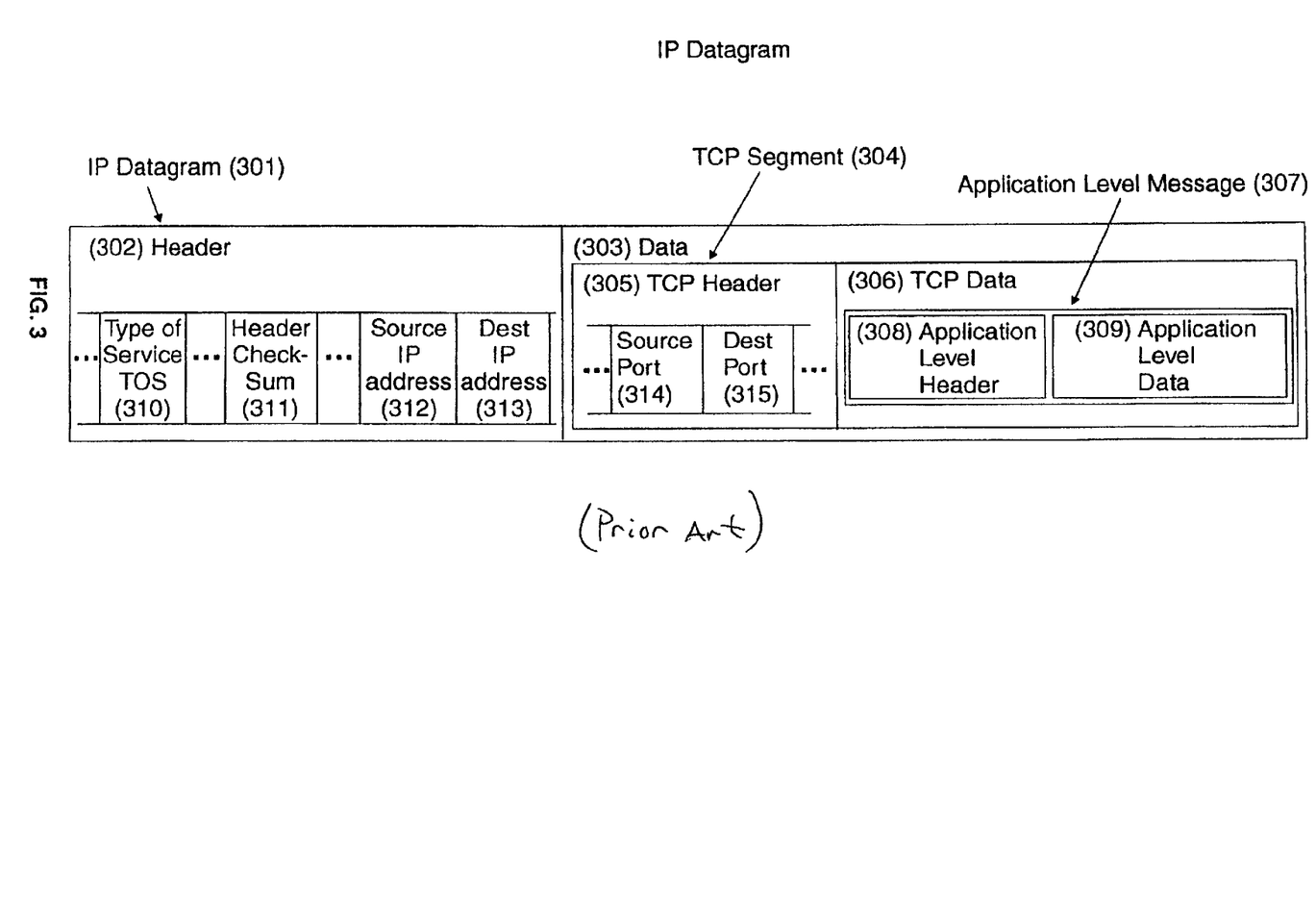
FIG. 3 shows an IP datagram according to prior art.

The transfer unit of a data packet in TCP/IP is referred to herein as an IP datagram. It is made up of a header containing information for IP protocol and data that is only relevant to the higher level protocol. FIG. 3 shows the format of an IP datagram 301 as implemented within the environment described in FIGS. 1 and 2.

IP datagram 301 is a message exchanged between computer systems across a TCP/IP network. As illustrated in FIG. 3, IP datagram 301 is divided into a header 302 and data 303. IP datagram header comprises a Type of Service (TOS) field 310 and is mainly used to route the IP datagram to its final destination. Data within TOS field 310 provides an indication of the quality of service requested for IP datagram 301. This quality of service request can be used to characterize the nature and the priority of IP datagram 301. A TOS value within TOS field 310 can be set either by the system initiating the connection (the source device), or on the fly by a network device (for instance an IP router) within the network.

A source IP address 312 provides an IP address of the source device which sends IP datagram 301. A destination IP address 313 provides an IP address of the destination device which receives IP datagram 301. A header checksum 311 is used by the destination device for checking that all fields in IP datagram header 302 have not been altered in the network. A header checksum 311 is a combination of all fields in IP datagram header 302.

An IP datagram data field 303 includes the data sent by the source device to the destination computer system. The destination computer system processes this data. Since the TCP/IP protocol suite is organized in layers, IP datagram data field 303 contains a message relevant to a higher level protocol, such as TCP. Within IP datagram field 303 is a TCP segment 304 which is a common name for a TCP message.

A TCP header 305 includes a source port field 314 and the destination port field 315 which identify the application protocol (e.g. HTTP, FTP, Telnet, Socks) transported by TCP. TCP header 305 is mainly used by the destination of the IP datagram to determine which application must process the data transported by TCP.

Also within TCP segment 304 is a TCP data field 306 that contains application data which are sent by the source device to the destination computer system. The destination computer system processes the data. Since the TCP/IP protocol suite is organized in layers, TCP data field 306 contains the information relevant to a higher Application Level protocol such as HTTP, FTP, Telnet, Socks.

As further depicted in FIG. 3, TCP data field 306 of the IP datagram contains an Application Level message 307 that may be, for example, a Socks message (for instance a "CONNECT" or a "BIND" message), a HTTP message, a FTP message, or a telnet message. Depending on the Application level protocol, Application Level message 307 can also be split into an Application Level header 308 which is the header relevant to the application protocol such as HTTP, FTP, Telnet, and Application Level data 309 which contains data that is processed by the application responsible of handling the Application Level protocol. Application Level data 309 is usually the data which is directly relevant to the end user (for instance, data entered by an end user on his workstation).

Socks Client and Socks Server

Figure 4:
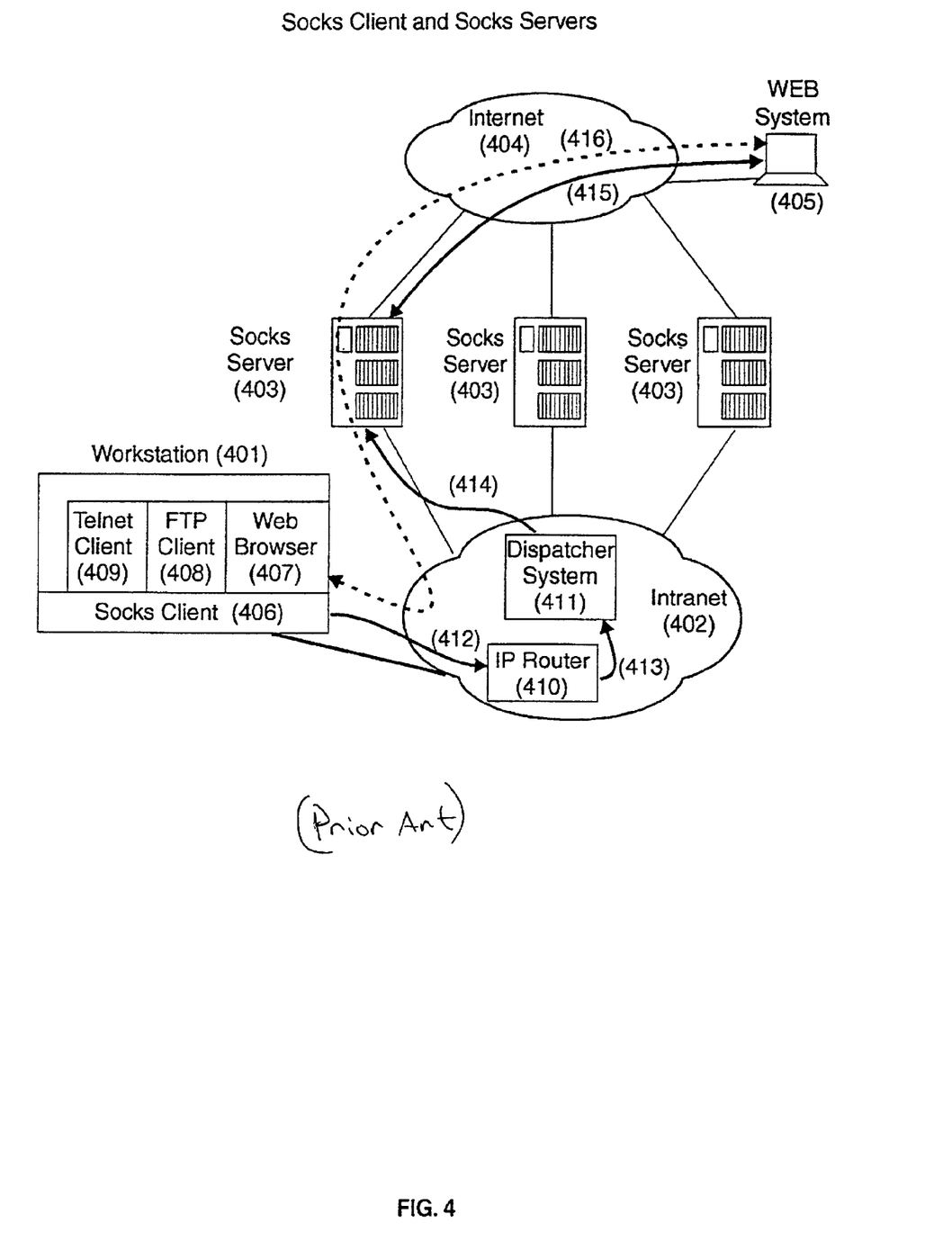
FIG. 4 is a general view of a Socks client with a plurality of Socks servers according to prior art.

A Socks is a well-known type of networking proxy protocol that allows client workstations to gain full access to hosts outside their local network while providing a high degree of security. FIG. 4 shows an end user workstation 401 connected to an Intranet 402. Several Socks servers 403 that protect Intranet 402 connect private Intranet 402 to a public Internet 404. A destination Web system 405 is also connected to Internet 404 (the Web system is for instance a Web browser, a FTP server, or any system attached to the Internet 404 that can be accessed from the Intranet 402).

As further depicted in FIG. 4, an end user workstation 401 includes a software program called Socks client 406 that provides a secure access to the World-Wide-Web (WWW) via Socks servers 403. Socks client 406 creates some form of "virtual tunnel" between workstation 401 and Socks servers 403. A Socks protocol is independent of any Application Level protocol, and can therefore be used for HTTP, FTP, or Telnet communications.

When multiple Socks servers 403 are used to access WEB systems on Internet 404, a dispatcher system 411 is often used to balance the traffic load across multiple Socks servers 403. End user workstation 401 thus accesses Socks servers 403 by means of dispatcher system 411 which acts as one virtual single Socks server.

The IP router 410 within Intranet 402 routes each IP datagram it receives towards its destination. The IP router determines the next hop 413, using the destination IP address field in the IP datagram header. WEB applications running on an end user workstation (such as a Web browser 407, an FTP client 408, or a Telnet client 409) use the services of a Socks client 406 to gain access to an outside WEB system 405. The Socks client located on the end user workstation sends 412 each IP datagram on the Intranet network to a destination Socks server. IP routers within the Intranet receive the IP datagrams and route them 413 towards their destination. The dispatcher system 411 which is viewed by Intranet as a Socks server receives the IP datagrams. The dispatcher system selects for each IP datagram the "best" Socks server, and forwards each IP datagram to the selected Socks server. The Socks server authenticates the user, authorizes the request, establishes a connection 415 with the outside WEB system, and then transparently forwards application data between the end user workstation and the WEB system 416.

Socks IP Router System

Figure 5:
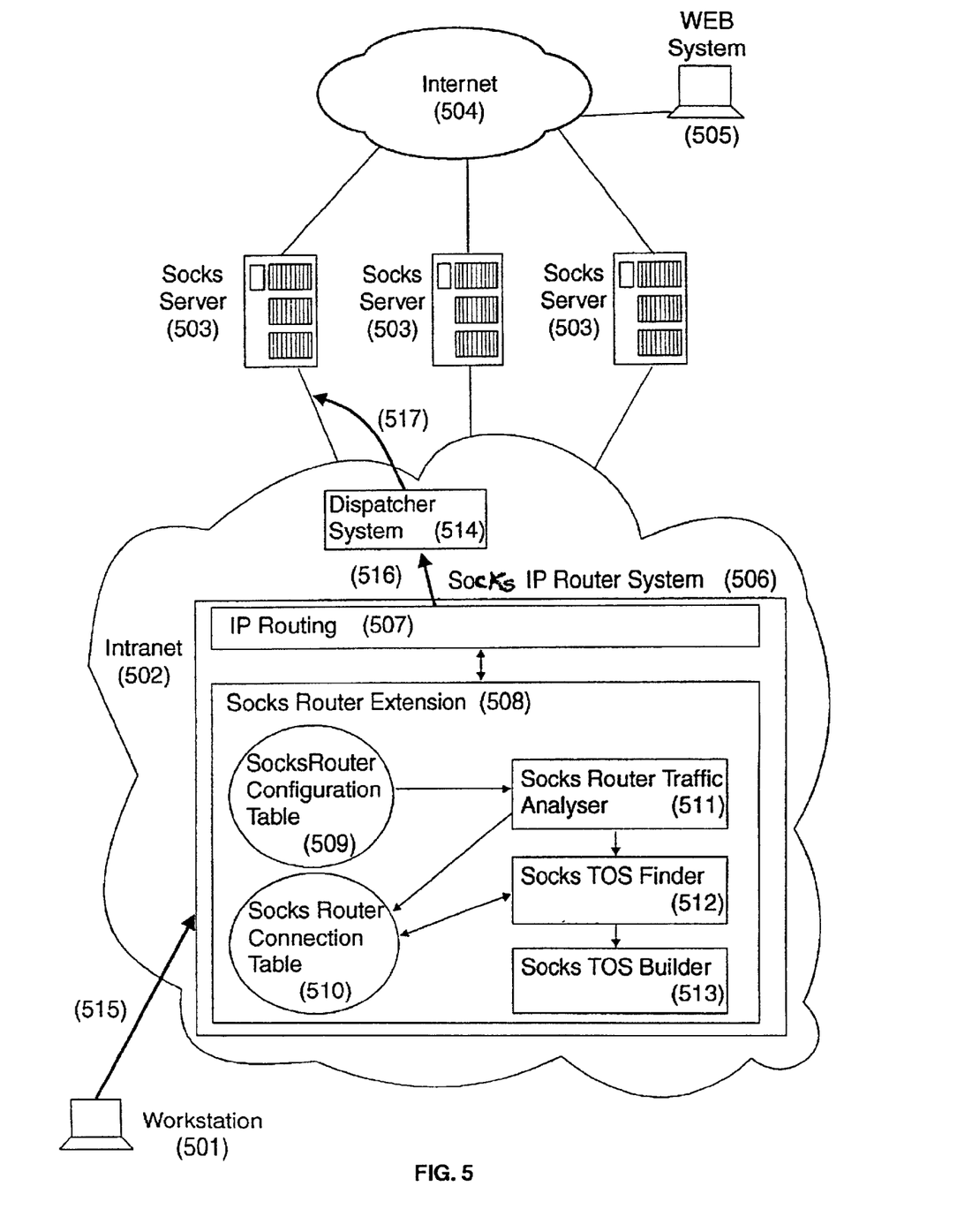
FIG. 5 depicts a system for routing IP datagrams transporting Socks traffic according to the present invention.

The present invention relates to a system and method for setting the TOS field of IP datagrams transporting Socks data according to the Application Level protocol used. FIG. 5 depicts a system for routing IP datagrams transporting Socks traffic according to the present invention.

An end user workstation 501 comprising a Socks client is connected to an Intranet 502. Multiple Socks servers 503 are available to access a WEB system 505 connected to the Internet 504. A dispatcher system 514 located within Intranet 502 dispatches Socks traffic on Socks servers 503. Dispatcher system 514 receives IP datagrams originated by an end user workstation 501. Upon receiving the datagrams, dispatcher system 514 selects the "best" Socks server to which the IP datagrams should be forwarded. This selection is performed using information contained in the TOS field of the IP datagram header. For instance an IP datagram with a TOS value of 0 will be forwarded to a low capacity Socks server, while an IP datagram with a TOS value of 7 will be forwarded to another more powerful Socks server.

The IP router within Intranet 502 responsible for handling IP datagrams with Socks data, is called "Socks IP router system" 506. Socks IP router system 506 includes an IP routing component 507 for routing any IP datagram within Intranet 502. IP router component 507 can be any existing IP router. Socks router system further includes a Socks router extension component 508.

Socks Router Extension

The Socks router extension sets the TOS field of the received IP datagrams according to the Application Level protocol of Socks data transported in the IP datagram. The Socks router extension is included within a table 509 with information concerning the Socks traffic. When Socks IP router system 506 receives 515 an IP datagram from an end user workstation 501 the datagram is forwarded to Socks router extension 508. The IP datagram is then forwarded in sequence to a plurality of other components including a Socks router traffic analyzer component 511, a Socks TOS finder 512, and a Socks TOS builder component 513.

Figure 6:
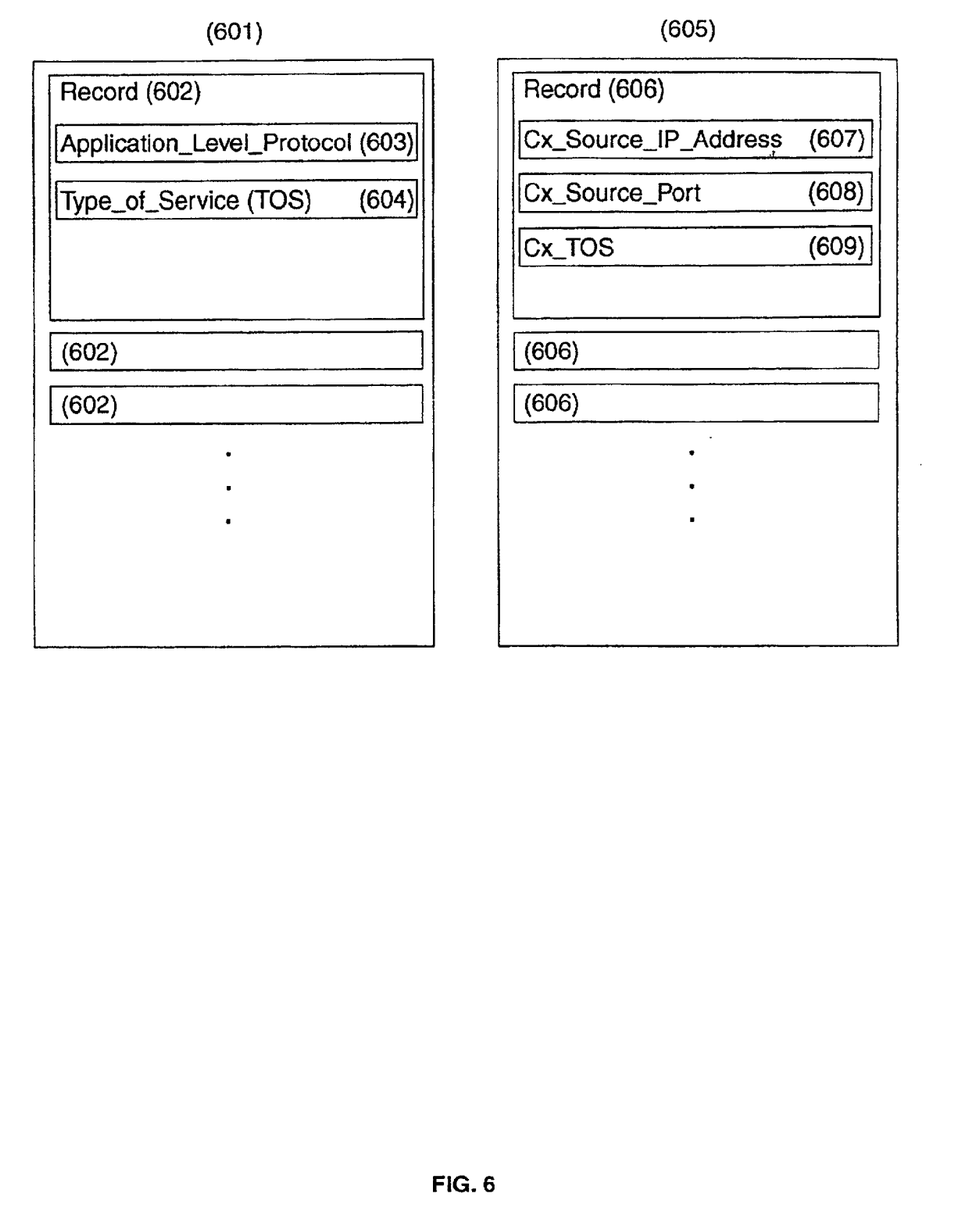
FIG. 6 illustrates tables used by the Socks Router Extension according to the present invention.

Socks router traffic analyzer component 511 analyses the IP datagram and builds a Socks router connection table 510 with the characteristics of the Socks connections using the Application Level protocol of the IP datagram jointly with a table comprising information concerning the Socks traffic (Socks router configuration table 601). Socks TOS finder component 512 determines the value of TOS field based on the Socks router connection table 510 and based on the source IP address and source port fields of the IP datagram. Socks TOS builder component 513 insert in the TOS field of the IP datagram the value previously determined by the Socks TOS Finder component.

Socks router extension 508 finally forwards the IP datagram to an IP router 507 component within the Socks IP router system. IP router component 507 delivers the IP datagram over routes 516 towards its destination. The invention is independent of the IP router component and does not rely on the way the IP datagram is handled and routed by this IP router component. A dispatcher system 514 that interacts with Intranet network 502 as a Socks server, receives the IP datagram. Dispatcher system 514 determines the optimal Socks server to which the IP datagram should be forwarded. This determination is made using, for instance, the value of TOS field previously set. The IP datagram is then forwarded 517 to the determined optimal Socks server.

Socks router extension 508 can be enabled or disabled within Socks IP router system 506 utilizing a configuration parameter in Socks IP router system 506. Typically, Socks router extension 508 is enabled on access Socks IP router systems at the edge of the Intranet and is disabled on the Socks IP router systems located within the Intranet.

Socks Router Extension Tables

FIG. 6 depicts tables utilized by the various components included within Socks router extension 508 for analyzing Socks traffic and determining the value of the TOS field. Socks router extension 508 uses a configuration table 509 that is represented in FIG. 6 as configuration table 601. Configuration table 601 is created (for instance by a Network Administrator) before starting the Socks router extension. Configuration table includes, for each Application Level protocol, the value that must be inserted in the TOS field of the IP datagram.

Socks router connection table 605 is dynamically constructed and used by the Socks router extension for internal purposes. This table comprises the source and the TOS of each Socks connection.

Socks Router Configuration Table

Socks router configuration table 601 (a flat file in a preferred embodiment) is created by the Network Administrator responsible for Intranet 502. This table associates each Application Level protocol with a TOS value. The table contains a list of records 602, each record comprising the following information Application_Level_Protocol (or ALP) 603 and a Type_Of_Service (or TOS) 604. Application_Level_Protocol (or ALP) 603 identifies the one value for each Application Level protocol. Typically, one record is defined for each of the main WWW protocols including Gopher, HTTP, FTP, Telnet, SSL (Secure HTTP).

Type_Of_Service (or TOS) 604 is the value of the TOS associated with the Application Level protocol 603. Type_Of_Service (or TOS) 604 is inserted in the TOS field of the IP datagrams transporting Socks data according to the Application Level protocol 603. For example, FTP can be associated with a TOS value of 0, while HTTP can be associated with a TOS value of 7. Thus, the traffic will be differentiated in accordance with the TOS field within the Intranet. For example, HTTP traffic will be handled with a higher priority than FTP traffic.

The Socks router configuration table also comprises default values (Type_Of_Service default values) for ALP values not explicitly defined in the table.

Socks Router Connection Table

Socks connection table 605 is an internal table built by the Socks TOS client and is used to store the identity of the source device and the TOS for each Socks connection. Socks connection table 605 contains a list of records 606, each record providing the following information. First a Cx_Source_IP_Address 607 is the IP address of the system which is the source (or originator) of the Socks connection (this system is called "originator" or "source device"). A Cx_Source_Port 608 is the number of the port identifying the program (the application) running on the origin device and which is the originator of the Socks connection. Cx_TOS 609 is the value of the TOS field for the Socks connection originated from the source uniquely identified by Cx_Source_IP Address 613 and Cx_Source_Port 614.

Socks Router Traffic Analyser

The Socks router traffic analyzer component 511 of Socks router extension 508 is preferably a computer program running on the Socks IP router system. This component is responsible for determining the Application Level protocol used by Sock data within each IP datagram received by the Socks IP router system, and building the Socks router connection table 605.

Figure 7:
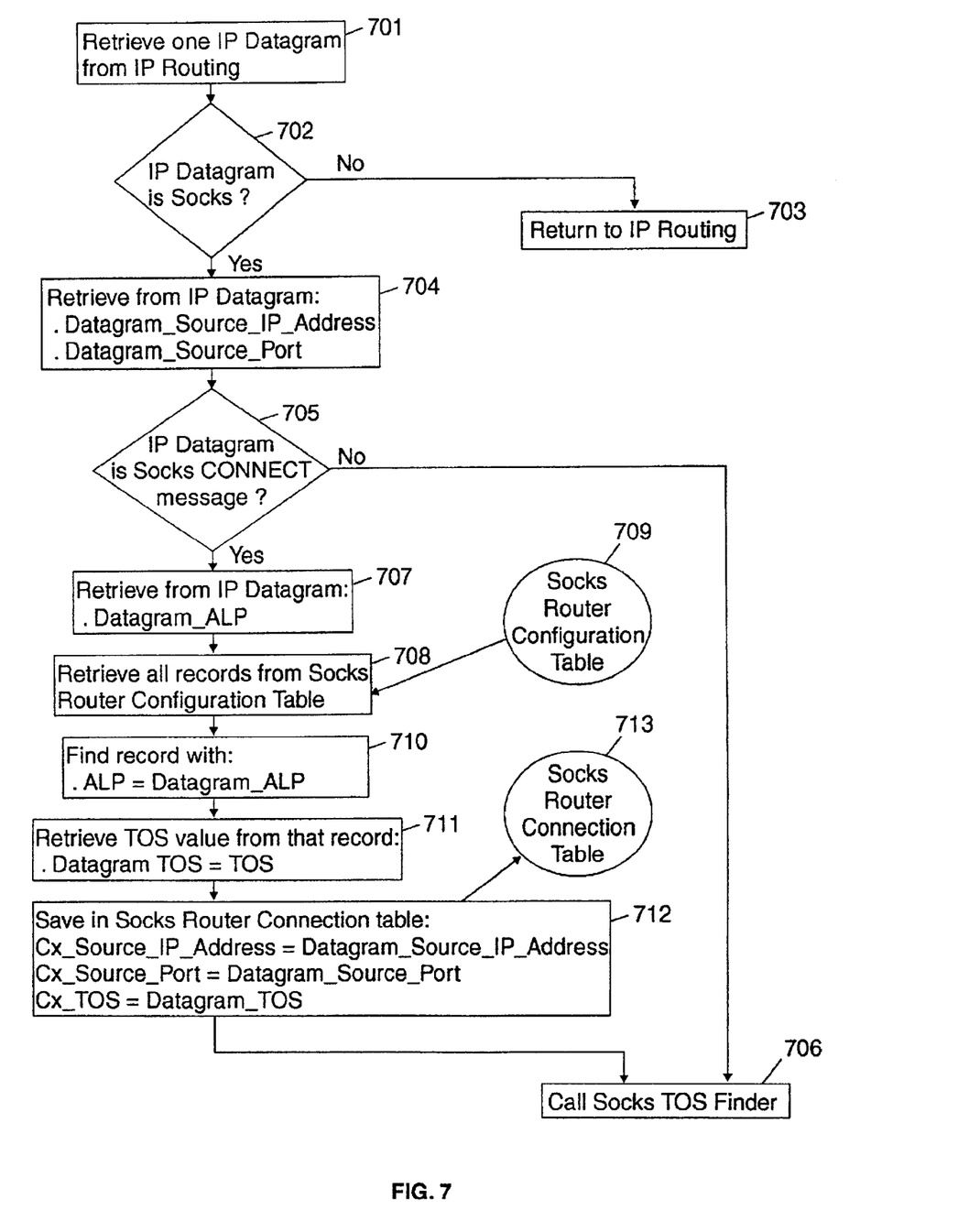
FIG. 7 is a flow chart of the Socks Router traffic analyzer component within the Socks IP Router system according to the present invention.

FIG. 7 is a flow chart illustrating the internal logic flow of Socks router traffic analyzer component 511. As shown at step 701 traffic analyzer component 511 retrieves an IP datagram. Next, as shown at step 702, traffic analyzer component 511 tests whether the IP datagram transports Socks traffic or not. The test preferably uses the destination port field of the TCP header comprised in the data part of the IP datagram. The destination port is compared to the port that uses the Socks protocol (by default, the port used by Socks is 1080). For example, the port used by the Socks protocol can be a configuration parameter of the Socks router extension. If the destination port in the TCP header is equal to the port used by Socks, then the IP datagram transports Socks traffic, otherwise the IP datagram does not transport Socks traffic and does not need to be processed by the Socks router extension.

If, as depicted at step 703, the IP datagram does not transport Socks traffic, Socks router extension 508 is not involved in the dispatching of non-Socks traffic. The IP datagram is directly forwarded to the IP router component 507 of Socks IP router system 506. The processing of the IP datagram by Socks router extension 508 is then completed. Socks router extension 508 waits for the next IP datagram.

If, as illustrated at step 704, the IP datagram transports Socks traffic, traffic analyzer component 511 identifies the originator of the IP datagram from information comprised in the IP header and TCP header. Such information includes the following:

Datagram_Source_IP_Address=Source IP address field (in IP header); and

Datagram_Source_Port=Source port field (in TCP header).

Proceeding to step 705, traffic analyzer component 511 checks if the IP datagram is a Socks CONNECT message. A Socks CONNECT message is identified by the CD field in the Application Level message (CD=1). If the IP datagram is a not a Socks CONNECT message, the IP datagram therefore belongs to a Socks connection which is already established. This means that a CONNECT message has already been received and the corresponding record has been created in the Socks router connection table. traffic analyzer component 511 responds by calling the Socks TOS finder component as depicted at step 706.

If the IP datagram is a Socks CONNECT message, and as shown at step 707, traffic analyzer component 511 determines from the IP datagram (in the Destport field of the Socks CONNECT message), the Application Level protocol (ALP) transported by the Socks connection wherein Datagram_ALP=Destport field (in Socks CONNECT message).

Next, as illustrate at step 708, traffic analyzer component 511 retrieves all records from the Socks router configuration table 709. This table is preferably read only once, and is cached by Socks router traffic analyzer 511 at configuration time, in order to minimize the impact on performances. As shown at step 710, traffic analyzer component 511 finds the record corresponding to the Application Level protocol (ALP) of the IP datagram. This record includes Application_Level_Protocol=Datagram_ALP. As depicted at step 711, traffic analyzer component 511 determines from that record the TOS of the IP datagram wherein Datagram_TOS=Type_Of_Service. At step 712, traffic analyzer component 511 saves the information for the Socks connection in a new record within the Socks router connection table 713. This saved information for the Socks connection includes: Cx_Source_IP_Address=Datagram_Source_IP_Address; Cx_Source_Port=Datagram_Source_Port; and Cx_TOS=Datagram_TOS. Finally, as depicted at step (706), traffic analyzer component 511 calls Socks priority finder component 512.

Socks TOS Finder

Figure 8:
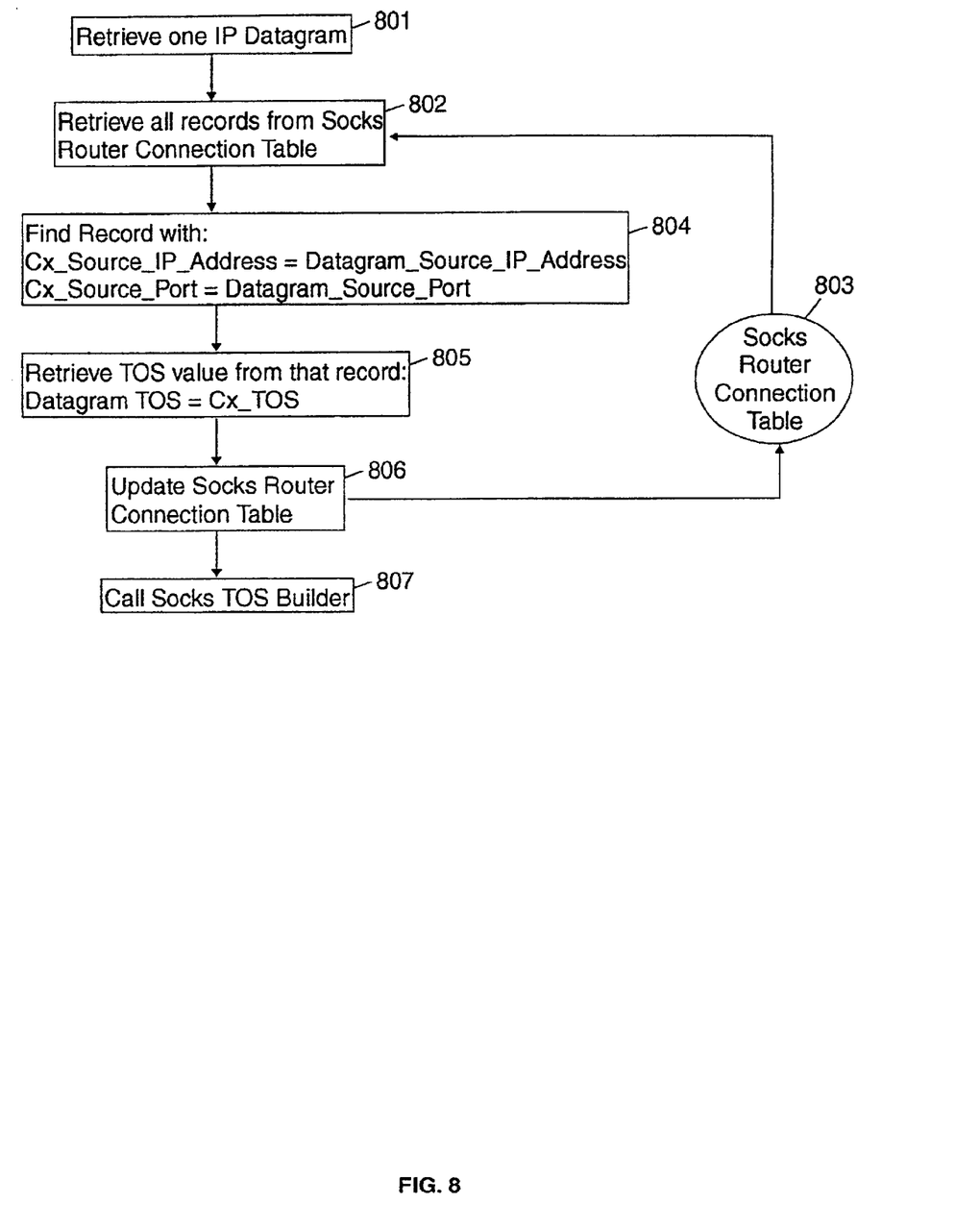
FIG. 8 is a flow chart of the Socks TOS Finder component within the Socks IP Router system according to the present invention.

Socks Priority finder component 512 of the Socks router extension 508 is preferably a computer program running on the Socks IP router system. Socks Priority finder component 512 determines the TOS value for the received IP datagram based on information included in Socks router connection table 605. FIG. 8 is a flow chart depicting the internal logic flow of Socks TOS finder 512. As illustrated at step 801, Socks priority finder 512 retrieves the IP datagram forwarded by Socks router traffic analyzer 511, along with the Datagram_Source_IP_Address and the Datagram_Source_Port.

Next as shown at step 802, Socks priority finder 512 retrieves all records from Socks router connection table 803. Step 804 depicts Socks priority finder 512 finding the record which corresponds to the Socks connection. This record is identified in accordance with: Cx_Source_IP_Address= Datagram_Source_IP_Address; and Cx_Source_Port= Datagram_Source_Port.

Proceeding to step 805, Socks priority finder 512 retrieves the TOS value which corresponds to that Socks connection record found at step 804. This TOS value is the value of the TOS field that must be set in the IP datagram as Datagram_TOS=Cx_TOS.

Figure 9:
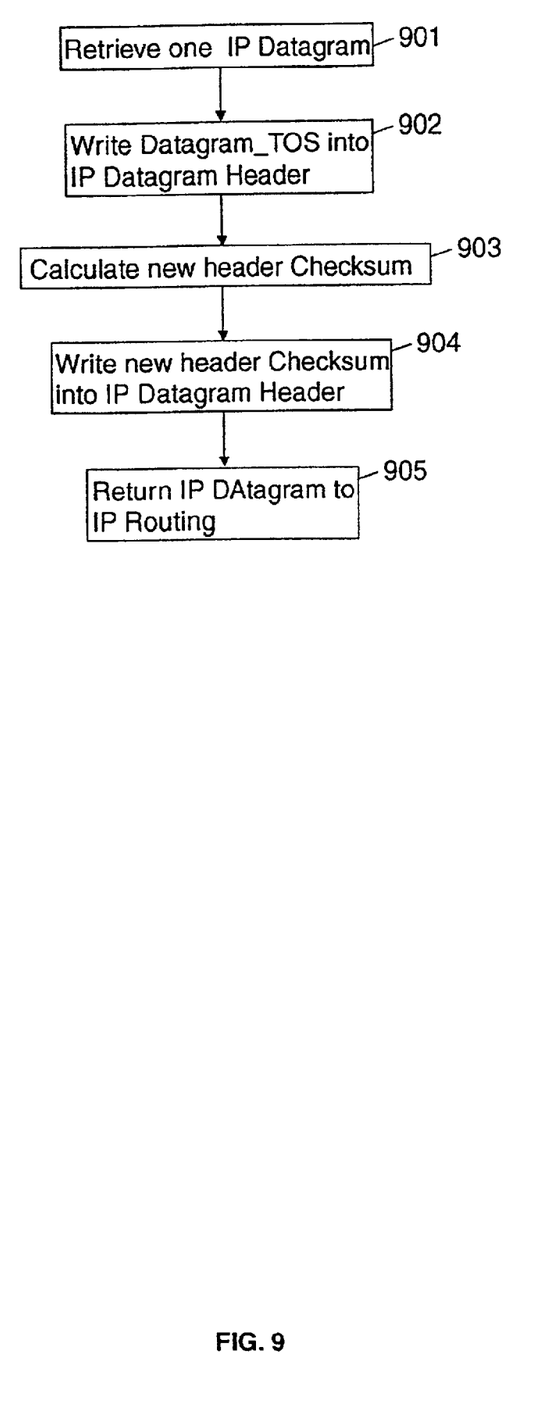
FIG. 9 is a flow chart of the Socks TOS Builder component within the Socks IP Router system according to the present invention.

As illustrated at step 806, Socks priority finder 512 removes records of closed Socks connections (terminated connections) from Socks router connection table 803. Closed Socks connections are detected, for example, using the FIN and ACK indications in the TCP header. Optionally, a Socks connection is considered closed after a certain period of time in which an IP datagram is not transported on that Socks connection (this timer value can be for instance a configuration parameter of the Socks router extension). Any other existing algorithm to detect closed or half closed (when one extremity of the connection has abnormally terminated) TCP connections can also be used to remove such connections from the table. Finally, step 807 depicts Socks priority finder 512 calling Socks TOS builder component Socks TOS Builder Socks TOS builder component 513 of Socks router extension 508 is preferably a computer program running on the Socks IP router system. Socks TOS builder 513 writes the TOS value determined by Socks TOS finder component 512 into the TOS field of the received IP datagram. FIG. 9 is a flow chart illustrating the internal logic flow of Socks TOS builder 513.

As depicted at step 901, Socks TOS builder 513 retrieves the IP datagram forwarded by Socks TOS finder 512, along with the Datagram_TOS. Next, Socks TOS builder 513 inserts the Datagram_TOS into the TOS field of the IP datagram, as illustrated at step 902. The Datagram_TOS overwrites the value of the TOS field present in the received IP datagram. Optionally, the TOS value written in the TOS field of the IP datagram can be a combination of both (by means of a specific configuration information, for example) including: the TOS value as received in the IP datagram; and the TOS value determined by Socks TOS finder component 512.

Proceeding to step 903, Socks TOS builder 513 calculates the new value of the header checksum field in the IP datagram header. The header checksum is a combination of all fields in the IP datagram header and is used by the destination of the IP datagram to make sure that all fields in the IP datagram header have not been altered by the network. The header checksum received in the IP datagram must be updated when header fields (the TOS) used to calculate the header checksum having been modified by Socks TOS builder 513. The new value is calculated using any existing algorithm used by any program building IP datagrams.

Next, as depicted at step 904, Socks TOS builder 513 writes the new value of the header checksum field in the IP datagram. Socks TOS builder 513 then forwards the IP datagram to the IP router component as shown at step 905. The IP router then sends the IP datagram towards its destination. The Socks router extension exits and waits for the next IP datagram.

Advantages

The present inventions provides the following advantages.

The TOS field of IP datagrams is representative of the Application Level protocol used for transporting Socks data. Any network device, such as a dispatcher system, can use this TOS field for differentiating IP datagrams according to the Application Level protocol used for transporting Socks data. For instance, HTTP traffic for the WEB can be set with a TOS value of 7, while batch FTP traffic can be set with a TOS value of 0. A dispatcher system can then use the TOS field to dispatch: HTTP traffic to a high capacity Socks server; and FTP traffic to a low capacity Socks server with low capacity. Thus, an optimized response time and availability can be provided to HTTP traffic.

Network devices such as IP routers may use the TOS field of the IP datagrams to determine some IP datagram characteristics such as the priority. Since the present invention associates a TOS value with the Application Level protocol, it therefore enables IP routers to process IP datagrams according to the Application Level protocol used by the Socks data they transport. For instance, IP routers within the network may already process and route IP datagrams with a TOS value of 7 faster than IP datagrams with a TOS value of 0. When HTTP is associated with TOS 7 and FTP is associated with TOS 0, the IP router will route and process faster the HTTP traffic. This mechanism provides an optimized response time for the HTTP WEB traffic.

One or multiple Socks IP router systems within the network may have the function of setting the TOS field. Such Socks router systems are typically IP routers at the edge of the network and are used for attaching groups of end users to the network backbone. The number of such systems is therefore limited and the administration TOS values and Application Level protocols can be easily centralized and controlled by a Network Administrator.

There is no impact nor dependency on the end user workstation. No specific software is required on end user workstations.

The association between TOS values and Application Level protocols is done by Socks IP router systems and not by end user workstations. Furthermore, this association cannot be altered by end users. The invention therefore allows a single and coherent policy within the network.

While the invention has been particularly shown and described with reference to a preferred embodiment, it will be understood that various changes in form and detail may be made therein without departing from the spirit, and scope of the invention.

What is claimed is:

1. A method for setting the value of a type of service field within an Internet Protocol (IP) datagram according to an application level protocol at which said IP datagram is being transmitted within a socks connection from a source application on a source device, said method comprising:

retrieving a source address of said source device from a source IP address field within an IP header of said IP datagram;

retrieving an application address of said source application from a source port field within a Transmission Control Protocol (TCP) header of said IP datagram;

associating a type of service value with said retrieved source address and said retrieved application address; and writing said type of service value in a type of service field within said IP datagram.

2. The method of claim 1, wherein said associating further includes:

determining whether or not said IP datagram includes a socks connect message for establishing a new socks connection; and in response to said IP datagram including a socks connect message:

updating a first table with said new socks connection identified by said retrieved source address and said retrieved application address;

identifying an application level protocol in accordance with said retrieved source address and said retrieved application address;

determining a type of service value referring to a second table, wherein said second table includes, for each application level protocol, a type of service value correlated to said retrieved source address and said retrieved application address; and associating, within said first table, said new socks connection with said determined type of service value.

3. The method of claim 2, wherein said first table is dynamic and includes, for each socks connection:

a source address for identifying said source device;

an application address for identifying said source application; and a type of service value associated with both said source address and said application address.

4. The method of claim 2, wherein said second table includes, for each application level protocol, a corresponding type of service value.

5. The method of claim 2, wherein said method further includes defining a default type of service value for application level protocols not defined in said second table.

6. The method of claim 1, wherein said IP datagram includes a header checksum field value, and wherein said writing further comprises updating said header checksum field value according to said type of service value.

7. The method of claim 1, wherein said method further includes:

receiving said IP datagram; and identifying said type of service field value upon receipt of said IP datagram.

8. An apparatus within a router for setting the value of a type of service field within an Internet Protocol (IP) datagram according to an application level protocol at which said IP datagram is transmitted within a socks connection from a source application on a source device, said apparatus comprising:

means for retrieving a source address from a source IP address field within an IP header of said IP datagram;

means for retrieving an application address of said source application from a source port field within a Transmission Control Protocol (TCP) header of said IP datagram;

means for associating a type of service value with said retrieved source address and said retrieved application address; and means for writing said type of service value in a type of service field within said IP datagram.

9. The apparatus of claim 8, wherein said means for associating further includes:

means for determining whether or not said IP datagram includes a socks connect message for establishing a new socks connection; and means for, in response to said IP datagram including a socks connect message:

updating a first table with said new socks connection identified by said retrieved source address and said retrieved application address;

identifying an application level protocol in accordance with said retrieved source address and said retrieved application address;

determining a type of service value referring to a second table, wherein said second table includes, for each application level protocol, a type of service value correlated to said retrieved source address and said retrieved application address; and associating within said first table, said new socks connection with said determined type of service value.

10. The apparatus of claim 9, wherein said first table is dynamic and includes, for each socks connection:

a source address for identifying said source device;

an application address for identifying said source application; and a type of service value associated with both said source address and said application address.

11. The apparatus of claim 9, wherein said second table includes, for each application level protocol, a corresponding type of service value.

12. The apparatus of claim 9, further comprising means for defining a default type of service value for application level protocols not defined in said second table.

13. The apparatus of claim 8, wherein said IP datagram includes a header checksum field value, and wherein said means for writing further comprises means for updating said header checksum field value according to said type of service value.

14. The apparatus of claim 8, further comprising:

means for receiving said IP datagram; and means for identifying said type of service field value upon receipt of said IP datagram.

15. A computer program product for setting the value of a type of service field within an Internet Protocol (IP) datagram according to an application level protocol at which said IP datagram is being transmitted within a socks connection from a source application on a source device, said computer program product comprising:

instruction means for retrieving a source address from a source IP address field within an IP header of said IP datagram;

instruction means for retrieving an application address of said source application from a source port field within a Transmission Control Protocol (TCP) header of said IP datagram;

instruction means for associating a type of service value with said retrieved source address and said retrieved application address; and instruction means for writing said type of service value in a type of service field within said IP datagram.

16. The program product of claim 15, wherein said instruction means for associating further includes:

instruction means for determining whether or not said IP datagram includes a socks connect message for establishing a new socks connection; and instruction means for, in response to said IP datagram including a socks connect message:

updating a first table with said new socks connection identified by said retrieved source address and said retrieved application address;

identifying an application level protocol in accordance with said retrieved source address and said retrieved application address;

determining a type of service value referring to a second table, wherein said second table includes, for each application level protocol, a type of service value correlated to said retrieved source address and said retrieved application address; and associating within said first table, said new socks connection with said determined type of service value.

17. The program product of claim 16, wherein said first table is dynamic and includes, for each socks connection:

a source address for identifying said source device;

an application address for identifying said source application; and a type of service value associated with both said source address and said application address.

18. The program product of claim 16, wherein said second table includes, for each application level protocol, a corresponding type of service value.

19. The program product of claim 16, wherein said program product further includes instruction means for defining a default type of service value for application level protocols not defined in said second table.

20. The program product of claim 15, wherein said IP datagram includes a header checksum field value, and wherein said instruction means for writing further comprises instruction means for updating said header checksum field value according to said type of service value.

21. The program product of claim 15, wherein said program product further includes:

instruction means for receiving said IP datagram; and instruction means for identifying said type of service field value upon receipt of said IP datagram.

* * * * *